US008505674B2

(12) United States Patent
Neubauer et al.

(10) Patent No.: US 8,505,674 B2
(45) Date of Patent: Aug. 13, 2013

(54) STEERING DRIVE FOR A MOTOR VEHICLE

(75) Inventors: Achim Neubauer, Sinzheim-Vormberg (DE); Michael Pesch, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 50 days.

(21) Appl. No.: 13/115,178

(22) Filed: May 25, 2011

(65) Prior Publication Data

US 2011/0290581 A1 Dec. 1, 2011

(30) Foreign Application Priority Data

May 25, 2010 (DE) .......................... 10 2010 029 248

(51) Int. Cl.
*B62D 5/04* (2006.01)
*H02K 1/06* (2006.01)

(52) U.S. Cl.
USPC ...... 180/443; 180/444; 180/446; 310/154.01; 310/156.35; 310/195; 310/216.092; 310/156.53

(58) Field of Classification Search
USPC .................. 180/443, 444, 446; 310/154.01, 310/156.35, 195, 216.092, 156.53
See application file for complete search history.

(56) References Cited

U.S. PATENT DOCUMENTS

| 4,825,972 A * | 5/1989 | Shimizu ........................ 180/444 |
| 2008/0023257 A1 | 1/2008 | Budaker et al. |
| 2010/0289370 A1 * | 11/2010 | Roth et al. ............... 310/156.53 |

OTHER PUBLICATIONS

Rudolph Richter, "Electric Machines" vol. 1, pp. 170ff. Julius Springer publisher: 1924.

* cited by examiner

*Primary Examiner* — Tashiana Adams
*Assistant Examiner* — Marlon Arce
(74) *Attorney, Agent, or Firm* — Michael Best & Friedrich LLP

(57) ABSTRACT

A steering drive for a motor vehicle comprising a steering wheel, a steering column, on which the steering wheel is disposed, a connecting rod, which interacts with the steering column to deflect the wheels of the motor vehicle, an electric motor, which is provided for boosting the steering thrust, as well as a belt drive, the electric motor interacting with the connecting rod via the belt drive. Said electric motor comprises a stator having twelve stator teeth as well as a rotor having ten rotor poles, the rotor poles being spaced apart from each other by an air gap and embodied as sinus poles.

20 Claims, 4 Drawing Sheets

STEERING DRIVE FOR A MOTOR VEHICLE

BACKGROUND OF THE INVENTION

The following invention relates to a steering drive for a motor vehicle for boosting the steering thrust, which comprises a belt drive.

Steering drives, which support the handling of the steering wheel and simplify the vehicular steering for the driver are frequently used in motor vehicles. The German patent publication DE 10 2004 059 A1 reveals such a steering drive. In the case of this steering drive, the electric motor required for boosting the steering thrust is disposed parallel to the steering column of the steering drive in order to save installation space. The disposal of the electric motor laterally to the steering column is also known from prior art. This arrangement requires more installation space in comparison to the parallel arrangement.

The electric motor of the aforementioned publication interacts with the steering column by means of a belt drive. In the case of this arrangement, the operating speed required for boosting the steering thrust is however very high so that the noise emissions by said electric motor are also very high. Furthermore, the tensile load on the shaft of the electric motor due to the belt is very large, which leads to a bowing of the rotor under load and causes additional noise generation.

In addition, steering drives for luxury-class vehicles require a very large assistance torque at a simultaneous high level of efficiency in order to load the on-board power supply system as little as possible. A belt drive of the kind mentioned in the aforementioned publication has however the advantage of loading the on-board power supply system only to a small extent on account of a high degree of efficiency of the arrangement. Nevertheless, a large assistance torque like that required for steering drives in luxury-class vehicles is very difficult to transfer or cannot be transferred at all via the steering column.

SUMMARY OF THE INVENTION

The aim of the present invention is to improve a steering drive in such a way that it is optimized for transferring a very high assistance torque at a simultaneous high level of efficiency while generating little noise in the driver's cab. At the same time, the steering drive can be cost-effectively manufactured.

The steering drive according to the invention comprises a steering wheel, a steering column, on which the steering wheel is disposed, a connecting rod, which interacts with the steering column to deflect the wheels of a motor vehicle, an electric motor, which is provided for boosting the steering thrust, and a belt drive. The electric motor thereby interacts with the connecting rod via the belt drive. Said electric motor has furthermore a stator with twelve stator teeth as well as a rotor with ten rotor poles, the rotor poles being spaced apart from each other by an air gap and embodied as sinus poles.

Because the electric motor interacts with the connecting rod according to the invention, the arrangement allows for the transfer of a large assistance torque. Due to the high level of efficiency of the belt drive, the on-board power supply system is loaded sufficiently low in this arrangement. At the same time, said electric motor is disposed in the engine compartment of the motor vehicle so that the noise level is low in the driver's cab even at high rpms. Furthermore, the noise level is reduced by the inventive use of an electric motor with twelve stator teeth and ten rotor poles embodied as sinus poles. This results from the fact that this design of the rotor poles causes a reduction in the harmonic content of the torques acting on the rotor.

A magnetic pole of an electric motor, whereat a sinus-shaped air-gap induction arises, is designated as the sinus pole. See also, for example, Rudolph Richter, "Electric Machines" Vol. 1, page 170ff., Julius Springer publisher: 1924.

A further advantage, which ensues from the sinus pole-shaped embodiment of the magnetic pole of the electric motor, is a significant reduction in the eddy current losses in the electric motor.

The air gap between the sinus poles is preferably expanded in the region between the sinus poles such that the air-gap induction is likewise approximately sinus-shaped. In so doing, the detent torques, particularly at engine idle, and furthermore the harmonic torques, particularly under load, are reduced in this region. In addition, the harmonic content of the torques acting on the rotor is thereby even further reduced and consequently the noise level is likewise further reduced.

The rotor is preferably disposed substantially parallel to the connecting rod so that the installation space required for the steering drive is small.

In a preferred embodiment, permanent magnets are provided in the rotor, the lines of force of which run radially and are oriented in opposite directions at opposing rotor poles. In another preferred embodiment, permanent magnets are provided in the rotor, the lines of force of which run in the circumferential direction of the rotor. The permanent magnets are thereby preferably distributed at an equal distance from each other along the circumference of the rotor. Said permanent magnets are furthermore preferably disposed in recesses of the rotor.

It is particularly preferred for a permanent magnet to be disposed in each rotor pole, the permanent magnets adjacent to one another being oppositely poled. It is likewise preferred for a permanent magnet to be disposed in every other rotor pole, the permanent magnets being of the same polarity. In the latter embodiment at least in the case of a magnetic field running radially, the opposite magnetic pole which in each case is oppositely positioned to the permanent magnet is formed by the yoke of the magnetic field through the material of the rotor so that a consequent-pole arrangement arises. The elimination of the permanent magnets is above all else cost efficient.

It is furthermore preferred for either every stator tooth or every other stator tooth to carry a stator winding. In the embodiment, in which only every other stator tooth carries a stator winding, a stator tooth is likewise formed by the magnetic yoke so that this arrangement is also referred to as a consequent-tooth arrangement.

In an embodiment which is likewise preferred, the stator includes a yoke having grooves, into which the stator teeth can be inserted. This allows for a winding of the stator teeth prior to placing said stator teeth on the yoke. In so doing, the stator teeth can carry more windings than is the case when winding the stator teeth of the same stator if said teeth are disposed on the yoke.

The rotor is preferably manufactured from one or a plurality of lamella packages in order to reduce eddy current losses. A plurality of lamella packages, which abut against each other and are tangentially offset relative to one another, is a particularly preferred embodiment. This tangential deviation of the lamella packages reduces the detent torque of the rotor.

BRIEF DESCRIPTION OF THE DRAWINGS

The invention is described below with the aid of figures. The figures are just examples and do not limit the general inventive idea.

DETAILED DESCRIPTION

Figure 1:
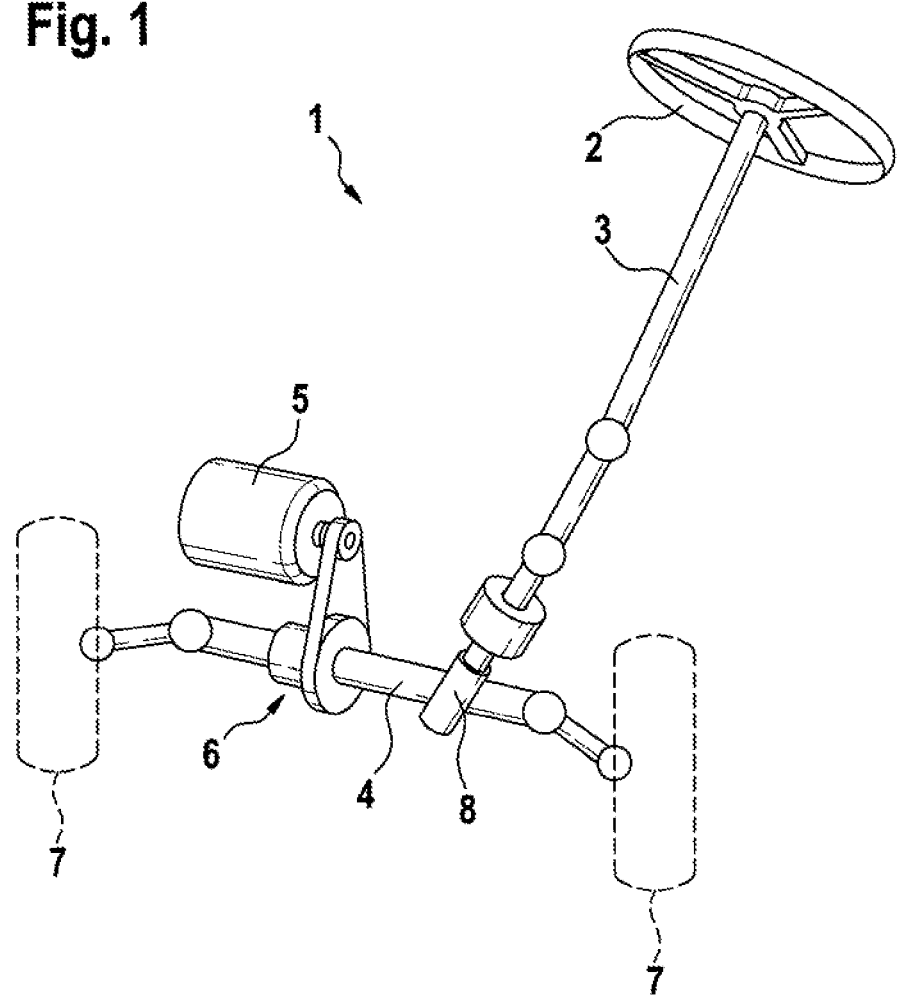
FIG. 1 schematically shows a steering drive according to the invention.

FIG. 1 schematically shows a steering drive 1 according to the invention. The steering drive 1 comprises a steering column 3, on which a steering wheel 2 is disposed for manipulation by a driver of the motor vehicle (not depicted). Said steering drive 1 furthermore comprises a connecting rod 4, which interacts with the steering column 3 by means of a gear assembly 8, particularly by means of a ball screw. In addition, said steering drive 1 comprises an electric motor 5, which interacts with the connecting rod 4 via a belt drive 6. The electric motor 5 is disposed in this instance substantially parallel to said connecting rod 4. The wheels 7 of the motor vehicle are additionally depicted here for the sake of clarification.

Figure 2:
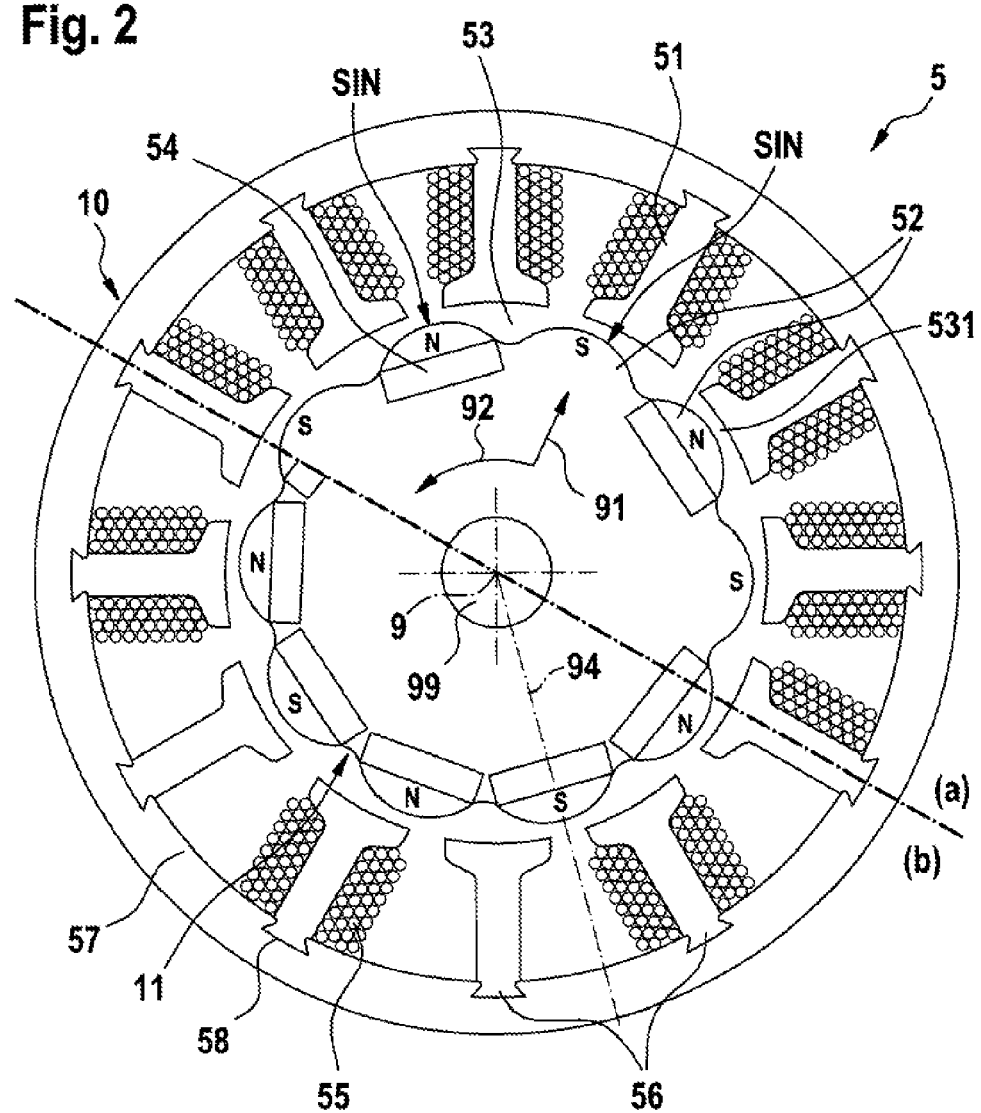
FIG. 2 schematically shows an exemplary embodiment of an electric motor for the steering drive according to the invention in a cross-sectional view, FIG. 3 schematically shows an embodiment of a rotor for an electric motor of the steering drive according to the invention in a cross-sectional view.

FIG. 2 schematically shows an embodiment of an electric motor 5 for the steering drive 1 according to the invention in a cross-sectional view. The depiction comprises a first embodiment of such an electric motor 5 in a first half (a) and a second embodiment of such an electric motor 5 in the second half (b).

The rotor 11 is arranged in a rotationally fixed manner on a rotor shaft 99, which is rotatable around a rotor axis 9. Furthermore, permanent magnets 54 are provided in said rotor 11 depicted here, the lines of force of which (not shown) run radially (i.e radially from the rotor axis 9) and are oriented in opposite directions at opposing rotor poles. A radial direction is indicated by an arrow 91.

The rotor 11 of the electric motor 5 for the steering drive 1 according to the invention has ten rotor poles. A permanent magnet 54 is provided only in every other rotor pole 52 in the embodiment of FIG. 2 (a), whereas each rotor pole 52 has a permanent magnet 54 in the embodiment of FIG. 2 (b). The rotor 11 of FIG. 2 (a) is therefore configured as a consequent-pole arrangement, in which a permanent magnet 54 in each case generates the opposite magnetic pole at the opposing rotor pole. All of the permanent magnets 54 of this embodiment have therefore the same magnetic polarity and in the present example are all embodied as north poles, which generate the south poles in the rotor poles 52 lying opposite to them by means of the magnetic yoke. In contrast the permanent magnets 54 adjacent to each other in the embodiment of FIG. 2 (b) have in each case an opposite magnetic polarity.

In addition, the rotor poles 52 are embodied according to the invention as sinus poles SIN and are separated from each other by air gaps 53.

The embodiment of the rotor poles 52 as sinus poles SIN means that each rotor pole 52 follows a path along its circumferential line, which ideally leads to a sinus-shaped magnetic induction in the air gap 531 between the stator 10 and the rotor 11. This is achieved because the air gap width between said stator 10 and said rotor 11 starting from an axis 94 of each rotor pole 52, which extends radially in said rotor, in each case bilaterally follows a path, which as a first approximation is inversely proportional to a cosine function. As a result, the air gap 531 expands between said stator 10 and said rotor 11.

The rotor poles 52 are furthermore separated from each other by air gaps 53. The contour of the expansion of these air gaps 53 is likewise preferably inversely proportional to the cosine function. Said expansion approximately follows the formula $1/\cos(P \cdot v)$. P is thereby the pole number of the electric motor 5 and v is a spatial angle starting from the axis 94 through the rotor pole 52.

In FIGS. 2 (a) and 2 (b), two different embodiments of the stator 10 are additionally shown. Said stator 10 has a yoke 57, on which twelve stator teeth 51 are arranged, which point radially in the direction of the rotor 11. In the exemplary embodiment of FIG. 2 (a) depicted here, a stator winding 55 is wound around each stator tooth 51 for the generation of an electromagnetic field (not shown); whereas in the exemplary embodiment of FIG. 2 (b) only every other stator tooth 51 carries a stator winding 55. This, however, too relates to a consequent-tooth arrangement due to the magnetic yoke.

In order to achieve the highest possible filling factor, the stator teeth 51 may in this case be inserted into the yoke 57 after being wound. In fact, each stator tooth 51 has a tooth base 56 and said yoke 57 has a groove for each stator tooth 51. Said stator teeth 51 can therefore in each case be inserted with their tooth base 56 into a groove 58 of said yoke 57. The tooth base 56 and the groove 58 are embodied in a dovetail-shaped manner.

The embodiment of the stator 10 shown in FIG. 2 (a) can also be combined in an electric motor 5 with the embodiment of the rotor 11 shown in FIG. 2 (b). Moreover, the embodiment of the rotor 11 shown in FIG. 2 (a) can also be combined in an electric motor 5 with the embodiment of the stator 10 shown in FIG. 2 (b).

Figure 3:
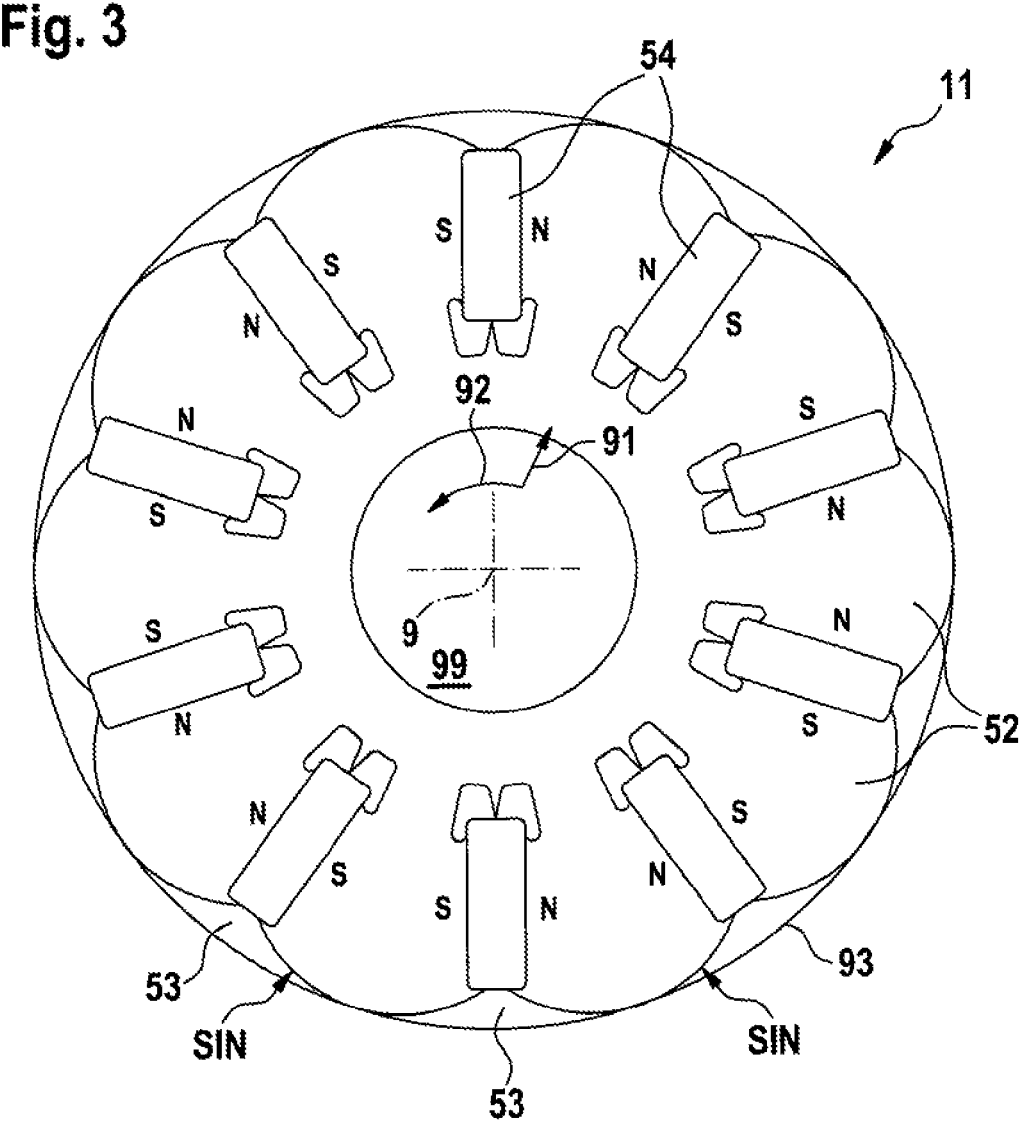

FIG. 3 schematically shows an embodiment of a rotor 11 for an electric motor 5 of the steering drive 1 according to the invention in a cross-sectional view. In contrast to the rotor 11 of FIG. 2, the rotor 11 shown here has permanent magnets 54, the lines of force of which (not shown) run in a circumferential direction of said rotor 11. The permanent magnets 54 are arranged as so-called spoke magnets. The circumferential direction is indicated with an arrow 92.

In the embodiment depicted here, a permanent magnet 54 is disposed between each rotor pole 52, the polarity of the permanent magnets 54 adjacent to each other being opposite. There is, however, in this instance also the option of an embodiment as a consequent-pole arrangement, in which a permanent magnet 54 is only disposed between every other rotor pole 52. In so doing, the permanent magnets 54 then have the same magnetic polarity. Both of the aforementioned embodiments of a rotor 11 having spoke magnets can be combined with the two previously mentioned embodiments of a stator 10 from FIG. 2.

The sinus-shaped embodiment of the rotor poles 52 is clarified because of the fact that an external radius 93, the center of which is the rotor axis 9, is indicated around the rotor 11.

Figure 4:
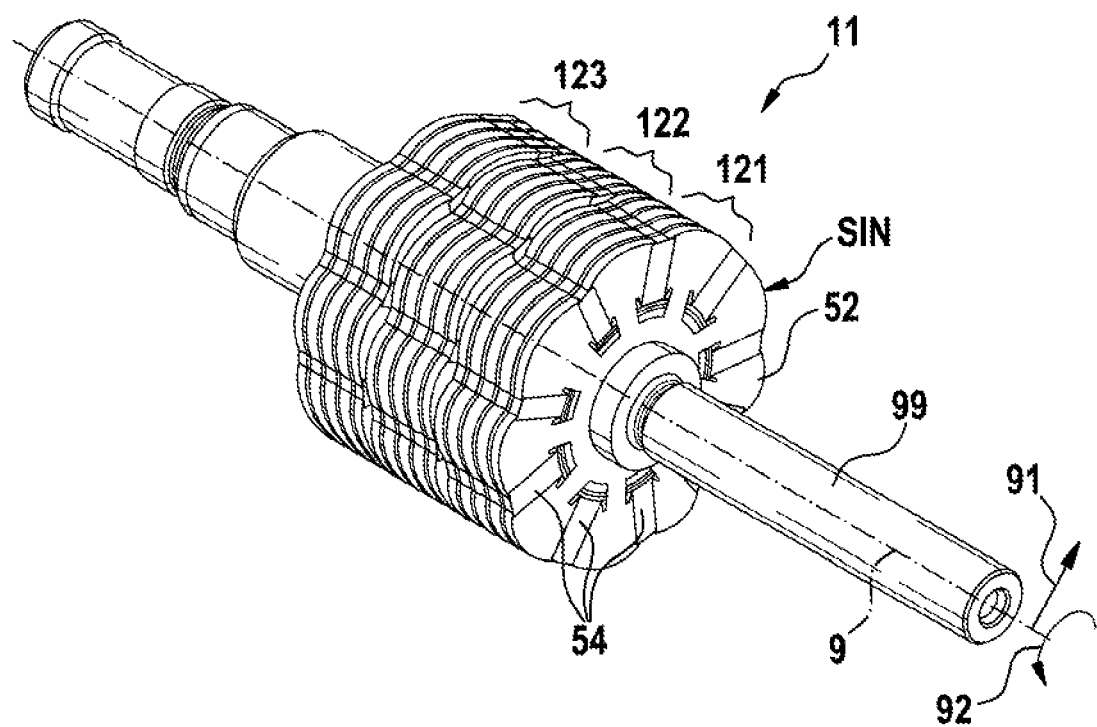
FIG. 4 shows a further embodiment of a rotor for an electric motor of the steering drive according to the invention in a perspective view.

FIG. 4 shows a further embodiment of a rotor 11 for an electric motor 5 of the steering drive 1 according to the invention in a perspective view. The rotor 11 comprises the shaft 99, which can be rotated around the rotor axis, and is manufactured from three lamella packages 121, 122, 123, which are provided in a rotationally fixed manner on said shaft 99 and abut against each other in the direction of the rotor axis 9. The three lamella packages 121, 122, 123 form rotor segments comprising in each case a large number of lamellas, which likewise abut against each other in the direction of said rotor axis 9. Permanent magnets 54 are in each case disposed in each lamella package 121, 122, 123, the permanent magnets 54 provided here generating a magnetic field (not shown) running in the circumferential direction 92. The rotor poles 52 of said rotor 11 are embodied as sinus poles SIN. Furthermore, said lamella packages 121, 122, 123 are arranged tangentially offset to one another; thus enabling the dent torque to be reduced. The reduction of the detent torque by a tangential offset in the rotor segments is also possible with a rotor of solid and not lamella design.

The invention claimed is:

1. A steering drive (1) for a motor vehicle comprising:
   a steering wheel (2),
   a steering column (3), on which the steering wheel (2) is disposed,
   a connecting rod (4), which interacts with the steering column (3) to deflect the wheels (7) of the motor vehicle,
   an electric motor (5), which is provided for boosting the steering thrust, and
   a belt drive,
   wherein the electric motor (5) interacts with the connecting rod (4) via the belt drive (6), said electric motor (5) comprising a stator (10) including a yoke (57) having grooves (58) into which twelve stator teeth (51) are inserted, as well as a rotor (11) having ten rotor poles (52), said rotor poles (52) are spaced apart from each other by an air gap (53) and are embodied as sinus poles (SIN).

2. The steering drive (1) according to claim 1, wherein the air gaps (53) expand.

3. The steering drive (1) according to claim 1, wherein the rotor (11) is disposed substantially parallel to the connecting rod (4).

4. The steering drive (1) according to claim 1, wherein permanent magnets (54) are provided in the rotor (11), the lines of force of which run radially (91) and are oriented in opposite directions at opposing rotor poles (52).

5. The steering drive (1) according to claim 1, wherein permanent magnets (54) are provided in the rotor (11), the lines of force of which run in the circumferential direction (92) of said rotor (11).

6. The steering drive (1) according to claim 1, wherein a permanent magnet (54) is disposed in each rotor pole (52), the permanent magnets (54) adjacent to each other being oppositely poled.

7. The steering drive (1) according to claim 1, wherein a permanent magnet (54) is disposed in every other rotor pole (52), the permanent magnets (54) being of the same polarity.

8. The steering drive (1) according to claim 1, wherein each stator tooth (51) carries a stator winding (55).

9. The steering drive (1) according to claim 1, wherein every other stator tooth (51) carries a stator winding (55).

10. The steering drive (1) according to claim 1, wherein the rotor (11) is manufactured from one or a plurality of lamella packages (121, 122, 123).

11. The steering drive (1) according to claim 10, wherein the several lamella packages (121, 122, 123) abut against each other and are tangentially offset relative to one another.

12. A steering drive (1) for a motor vehicle comprising:
    a steering wheel (2),
    a steering column (3), on which the steering wheel (2) is disposed,
    a connecting rod (4), which interacts with the steering column (3) to deflect the wheels (7) of the motor vehicle,
    an electric motor (5), which is provided for boosting the steering thrust, and
    a belt drive,
    wherein the electric motor (5) interacts with the connecting rod (4) via the belt drive (6), said electric motor (5) comprising a stator (10) having twelve stator teeth (51), as well as a rotor (11), manufactured from one or a plurality of lamella packages (121, 122, 123), having ten rotor poles (52), said rotor poles (52) are spaced apart from each other by an air gap (53) and are embodied as sinus poles (SIN).

13. The steering drive (1) according to claim 12, wherein the air gaps (53) expand.

14. The steering drive (1) according to claim 12, wherein the rotor (11) is disposed substantially parallel to the connecting rod (4).

15. The steering drive (1) according to claim 12, wherein permanent magnets (54) are provided in the rotor (11), the lines of force of which run radially (91) and are oriented in opposite directions at opposing rotor poles (52).

16. The steering drive (1) according to claim 12, wherein permanent magnets (54) are provided in the rotor (11), the lines of force of which run in the circumferential direction (92) of said rotor (11).

17. The steering drive (1) according to claim 12, wherein a permanent magnet (54) is disposed in every other rotor pole (52), the permanent magnets (54) being of the same polarity.

18. The steering drive (1) according to claim 12, wherein every other stator tooth (51) carries a stator winding (55).

19. The steering drive (1) according to claim 12, thereby characterized in that the stator (10) includes a yoke (57) having grooves (58), into which the stator teeth (51) can be inserted.

20. The steering drive (1) according to claim 12, wherein the several lamella packages (121, 122, 123) abut against each other and are tangentially offset relative to one another.

* * * * *